(12) United States Patent
Ishikawa et al.

(10) Patent No.: US 9,059,622 B2
(45) Date of Patent: Jun. 16, 2015

(54) WINDSHIELD WIPER MOTOR

(71) Applicant: MITSUBA CORPORATION, Kiryu-shi, Gunma (JP)

(72) Inventors: Masaru Ishikawa, Kiryu (JP); Kenji Sakata, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 303 days.

(21) Appl. No.: 13/771,333

(22) Filed: Feb. 20, 2013

(65) Prior Publication Data

US 2013/0162087 A1 Jun. 27, 2013

Related U.S. Application Data

(63) Continuation of application No. 12/934,183, filed as application No. PCT/JP2009/055493 on Mar. 19, 2009, now Pat. No. 8,604,662.

(30) Foreign Application Priority Data

Mar. 24, 2008 (JP) .................................. 2008-075902
Oct. 30, 2008 (JP) .................................. 2008-280551

(51) Int. Cl.
*H02K 13/10* (2006.01)
*H02K 23/20* (2006.01)
*H02K 23/04* (2006.01)
(Continued)

(52) U.S. Cl.
CPC . *H02K 23/20* (2013.01); *H02K 1/17* (2013.01)

(58) Field of Classification Search
CPC ........ H02K 23/00; H02K 23/20; H02K 23/04
USPC .................................. 310/238–239, 234, 206
See application file for complete search history.

(56) References Cited

U.S. PATENT DOCUMENTS 4,754,184 A 6/1988 Morikane et al.
5,023,532 A 6/1991 Gakenholz
(Continued)

FOREIGN PATENT DOCUMENTS

JP 45-004747 3/1970
JP 61-112556 5/1986
(Continued)

OTHER PUBLICATIONS

Chinese Office Action dated Jan. 14, 2013 and English translation thereof.

*Primary Examiner* — Burton Mullins
(74) *Attorney, Agent, or Firm* — McCormick, Paulding & Huber LLP

(57) ABSTRACT

A wiper motor 10 includes: an armature 20; an armature shaft 21; a core 20a composed of eighteen teeth portions; a commutator 23 having eighteen commutator bars 23a1 to 23a18; and a winding 20b composed of eighteen coil portions 20b1 to 20b18; an equalizer 27 composed of nine connecting conductors 27a1 to 27a9; a first brush 36, a second brush 35 shifted from a first brush 26 by 90 degrees, and a third brush 37 shifted from the first and second brushes by 90 or more degrees, each brush being arranged so as to come in sliding contact with the commutator bars, the first brush being connected to a common electric potential, a current for rotating the armature at low speed is selectively supplied to the second brush, and a current for rotating the armature at high speed is selectively supplied to the third brush.

16 Claims, 7 Drawing Sheets

(51) Int. Cl.
*H02K 23/30* (2006.01)
*H02K 1/17* (2006.01)

(56) References Cited

U.S. PATENT DOCUMENTS

| | | | |
|---|---|---|---|
| 5,047,679 A | 9/1991 | Baader et al. | |
| 5,485,049 A | 1/1996 | Shannon et al. | |
| 5,744,890 A | 4/1998 | Yamaguchi et al. | |
| 6,043,581 A | 3/2000 | Tanaka et al. | |
| 6,127,759 A | 10/2000 | Tanaka et al. | |
| 6,320,293 B1 | 11/2001 | Yamada et al. | |
| 6,462,454 B2 | 10/2002 | Yamamoto et al. | |
| 6,617,744 B2 | 9/2003 | Kershaw et al. | |
| 6,677,693 B2 | 1/2004 | Ooyama | |
| 6,703,751 B2 | 3/2004 | Tanaka et al. | |
| 7,291,957 B2 | 11/2007 | Simofi-Ilyes et al. | |
| 7,557,484 B2 | 7/2009 | Kawashima et al. | |
| 2002/0079758 A1 | 6/2002 | Matsuyama et al. | |
| 2008/0231137 A1 | 9/2008 | Sugishima et al. | |
| 2010/0052440 A1 | 3/2010 | Shioda et al. | |
| 2010/0187899 A1* | 7/2010 | Suzuki | 303/3 |
| 2011/0018380 A1 | 1/2011 | Yoshida et al. | |
| 2011/0095638 A1* | 4/2011 | Sakata et al. | 310/179 |
| 2011/0198954 A1 | 8/2011 | Saito et al. | |
| 2011/1098954 | 8/2011 | Saito et al. | |

FOREIGN PATENT DOCUMENTS

| | | |
|---|---|---|
| JP | 02-184246 | 7/1990 |
| JP | 03-11963 | 1/1991 |
| JP | 03-500960 A | 2/1991 |
| JP | 05-018272 | 3/1993 |
| JP | 7-28756 | 5/1995 |
| JP | 09-023627 | 1/1997 |
| JP | 10-503640 A | 3/1998 |
| JP | 2000-060049 A | 2/2000 |
| JP | 2000-166185 A | 6/2000 |
| JP | 2001-095219 A | 4/2001 |
| JP | 2001-112217 A | 4/2001 |
| JP | 2001-320862 A | 11/2001 |
| JP | 2002-017061 A | 1/2002 |
| JP | 2002-058227 A | 2/2002 |
| JP | 2002-218692 A | 8/2002 |
| JP | 2002-233123 A | 8/2002 |
| JP | 2002-291210 A | 10/2002 |
| JP | 2002-305861 A | 10/2002 |
| JP | 2002-315274 A | 10/2002 |
| JP | 2002-325390 A | 11/2002 |
| JP | 2003-153488 A | 5/2003 |
| JP | 2004-056851 A | 2/2004 |
| JP | 2004-248460 A | 9/2004 |
| JP | 2004-274816 A | 9/2004 |
| JP | 2004-274821 A | 9/2004 |
| JP | 2004-289992 A | 10/2004 |
| JP | 2005-012945 A | 1/2005 |
| JP | 2006-352993 A | 12/2006 |
| JP | 2006-353019 A | 12/2006 |
| JP | 2007-173278 A | 7/2007 |
| JP | 2008-092731 A | 4/2008 |
| JP | 2008-131800 A | 6/2008 |
| JP | 2008-253086 A | 10/2008 |
| JP | 2008-253137 A | 10/2008 |
| JP | 2009-017719 A | 1/2009 |
| JP | 2010-011697 A | 1/2010 |
| JP | 2010-017078 A | 1/2010 |
| JP | 2010-022198 A | 1/2010 |
| JP | 2010-022199 A | 1/2010 |
| JP | 2010-022200 A | 1/2010 |
| JP | 2010-022201 A | 1/2010 |
| JP | 2010-035403 A | 2/2010 |
| JP | 2010-035405 A | 2/2010 |
| JP | 2012-187000 A | 9/2012 |
| JP | 2012-200145 | 10/2012 |
| JP | 2012-200146 | 10/2012 |
| WO | 2005-076442 A1 | 8/2005 |
| WO | 2010-001899 A1 | 1/2010 |
| WO | 2010-041448 A1 | 4/2010 |

* cited by examiner

WINDSHIELD WIPER MOTOR

CROSS-REFERENCE TO RELATED APPLICATION

The present application is a continuation application of U.S. patent application Ser. No. 12/934,183 filed Sep. 23, 2010, which is entitled to the benefit of PCT/JP2009/055493 filed Mar. 19, 2009, and Japanese Patent Applications Nos. JP2008-075902 filed on Mar. 24, 2008, and JP2008-280551 filed on Oct. 30, 2008, the contents of all are hereby incorporated by reference into this application.

TECHNICAL FIELD OF THE INVENTION

The present invention relates to a wiper motor used in a wiper device of wiping a surface such as a windshield glass in an auto vehicle.

BACKGROUND OF THE INVENTION

As a wiper motor of this type, a wiper motor having four magnets is known, in this wiper motor, magnetic saturation in a yoke is reduced, torque is improved, and the wiper motor can be reduced in size (see, for example, Japanese Patent Application Laid-Open Publication No. JP2007-143278 (FIGS. 2 and 3)).

SUMMARY OF THE INVENTION

The wiper motor disclosed in the above Patent Document is small in size, but it can generate a large torque. However, the wiper motor generates large vibration and large noises, so this wiper motor is not brought into commercial use.

Accordingly, the present invention is to provide a wiper motor having four magnets, and it can generate a large torque without generating large vibrations and large noises.

According to one aspect of the present invention, there is provided a wiper motor having: a speed reduction unit with an output shaft for driving a wiper apparatus of an automotive vehicle; and an electric motor for driving the speed reduction unit, the electric motor comprising: magnetic field generating means composed of: a magnetic yoke formed into a bottomed cylinder; and four magnets arranged cylindrically on an inner surface of the magnetic yoke, and alternatively in north and south magnetic poles, an armature surrounded with the magnets and accommodated in the magnetic yoke, the armature having: an armature shaft rotatably supported by the magnetic yoke; a core fixed to the armature shaft, the core being composed of eighteen teeth portions; a commutator fixed to the armature shaft, the commutator being composed of: a commutator body formed of insulating resin, and eighteen commutator bars insulated from each other and arranged on the commutator body; and a winding composed of eighteen coil portions wound on the teeth portions, each of the coil portions surrounding corresponding teeth portions, each of the coil portions of the winding having two terminals connected to corresponding commutator bars adjacent to each other; an equalizer composed of nine connecting conductors each of which is electrically connected to two corresponding commutator bars opposite to each other, and brush assemblies including a first brush, a second brush shifted from the first brush by 90 degrees, and a third brush shifted from the first and second brushes by 90 or more degrees, each brush being arranged so as to come in slidably contact with the commutator bars, the first brush being connected to a common electric potential, a current for rotating the armature at low speed is selectively supplied to the second brush, and a current for rotating the armature at high speed is selectively supplied to the third brush.

BEST MODE FOR CARRYING OUT THE INVENTION

Figure 1:
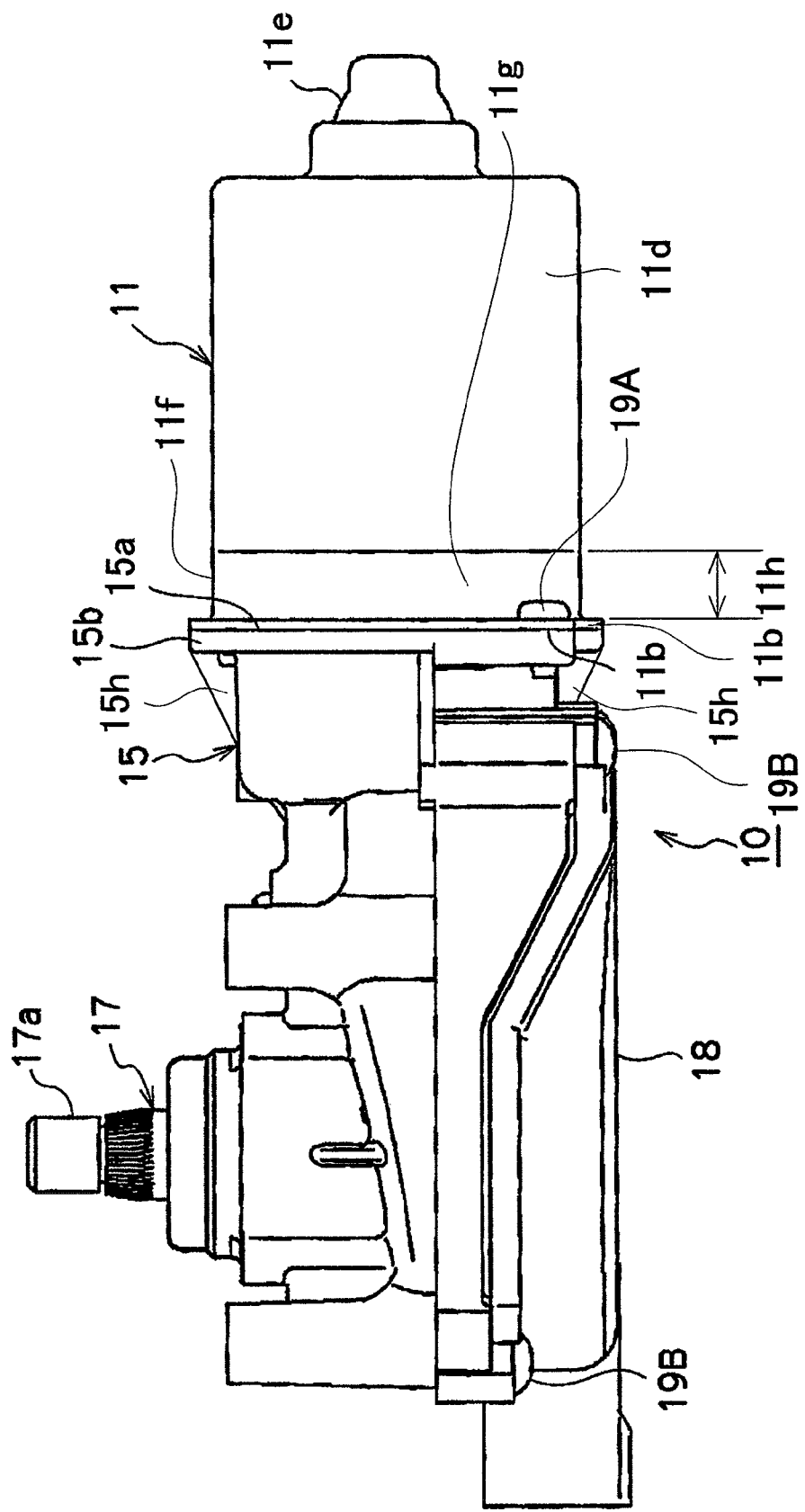
FIG. 1 is a side view illustrating a wiper motor according to a first embodiment of the present invention.

Hereinafter, a first embodiment of the present invention will be described with reference to the accompanying drawings.

As illustrated in FIGS. 1 to 5, a wiper motor 10 includes: a bottomed substantially-cylindrical magnetic yoke (motor yoke) 11, a gear case 15, and a gear case cover 18. An armature 20 is accommodated in the magnetic yoke (motor yoke) 11, and a flange portion 11b is formed around an opening portion 11a of this magnetic yoke 11. A speed reduction mechanism 26 for reducing the rotation of an armature shaft 21 of the armature 20 is stored in gear case. A flange portion 15b is formed around an opening portion 15a of the gear case 15. The flange portion 15b of the gear case 15 and the flange portion 11b of the magnetic yoke 11 are fastened and fixed to each other by screws 19A. The gear case cover 18 covers an opening portion 15d of a speed-reduction-mechanism storing portion 15c in the gear case 15, and the gear case cover 18 is fastened and fixed to the gear case 15 by screws 19B.

Figure 2:
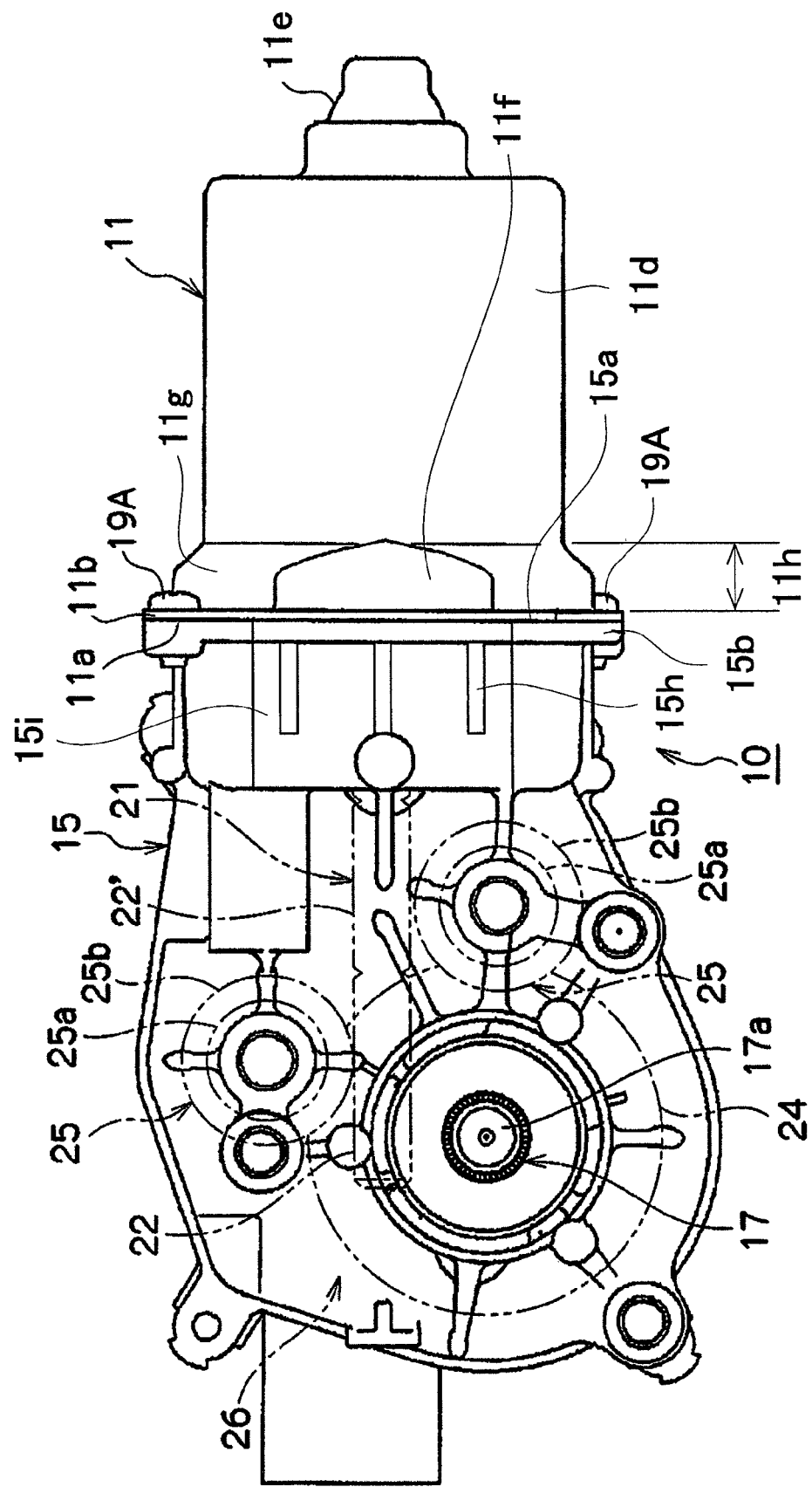
FIG. 2 is a plan view of the wiper motor.
Figure 3A:
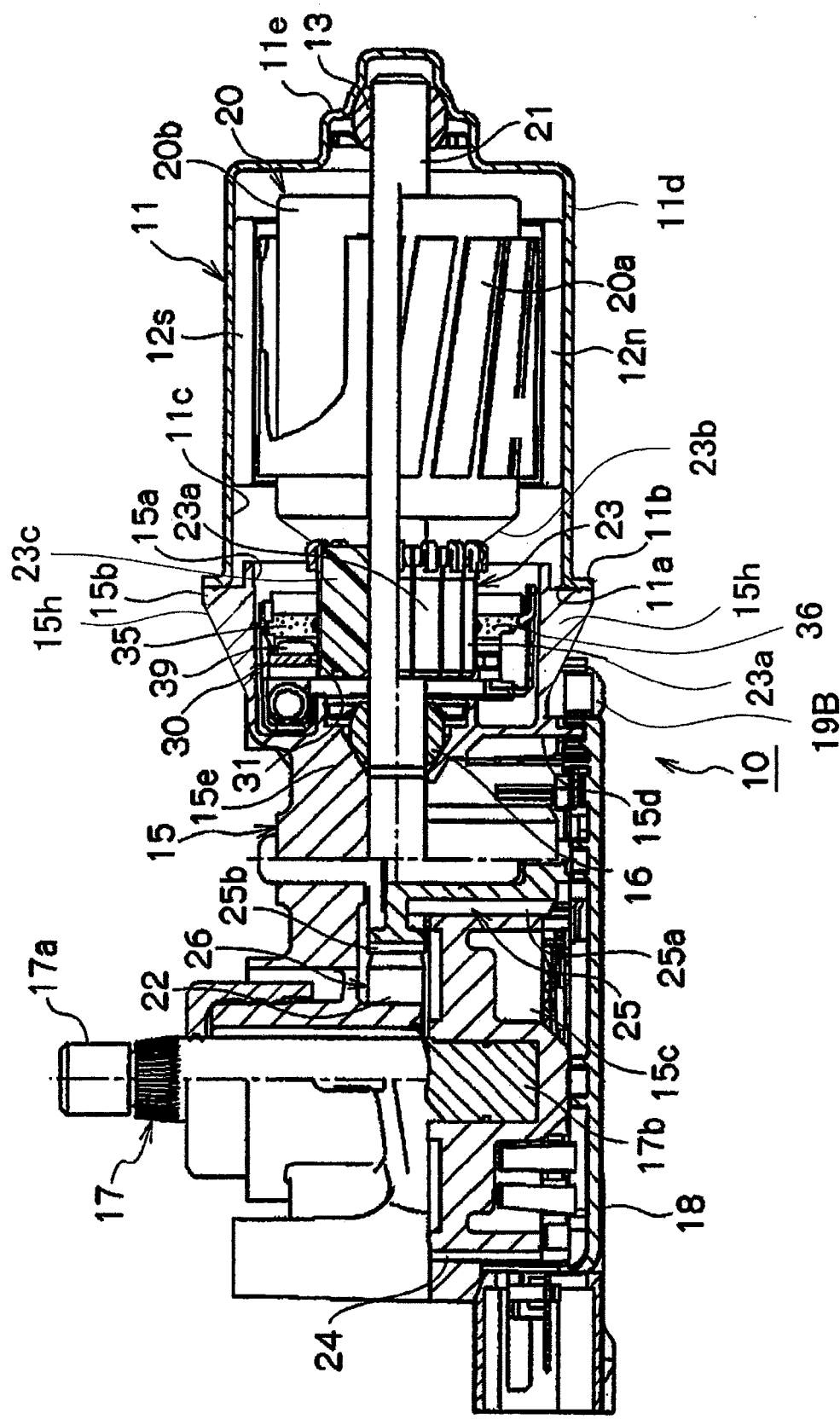
FIG. 3A is a cross-sectional view of the wiper motor.
Figure 5:
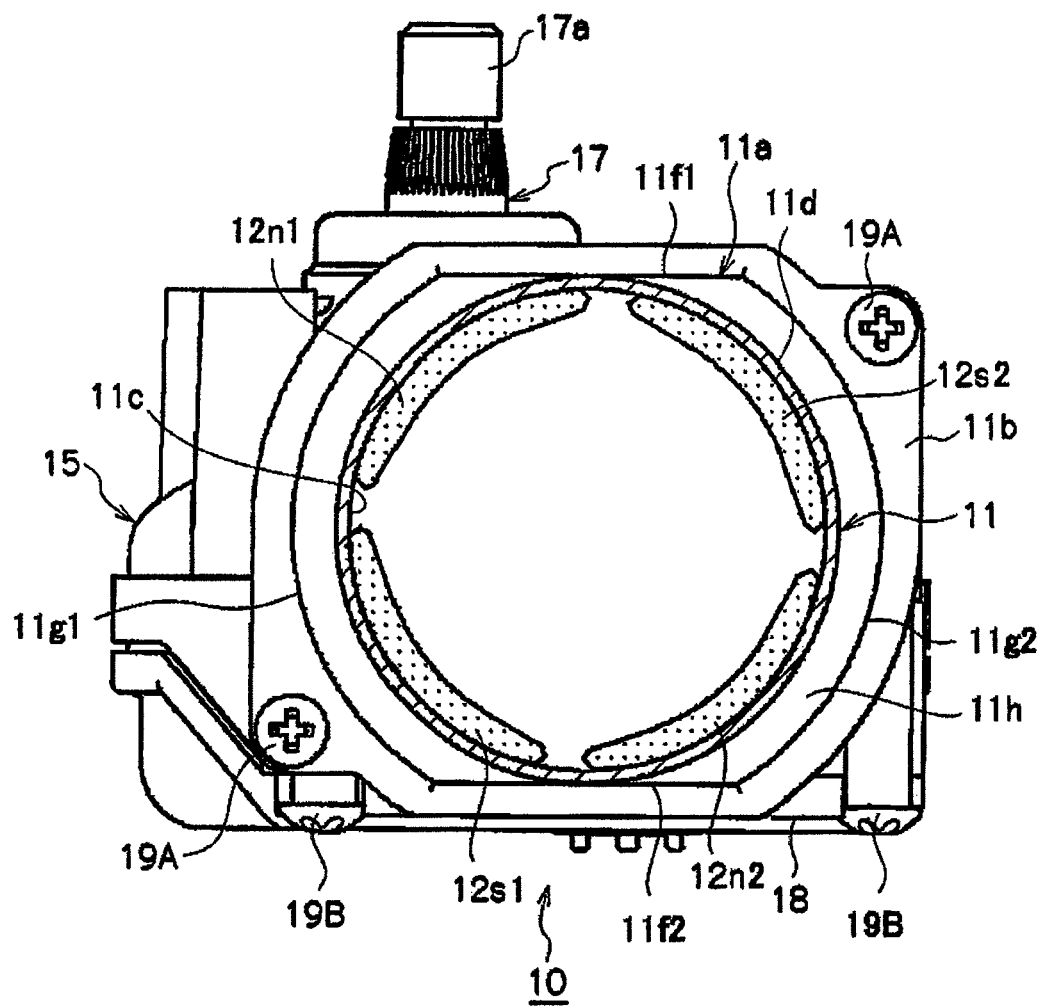
FIG. 5 is a cross-sectional view of a principal part of a yoke jointed to the gear case.

As illustrated in FIGS. 3A and 5, the yoke 11 is provided with a magnet storing portion 11d in which four magnets 12n1, 12n2, 12s1, and 12s2 are stored. On an inner peripheral surface 11c of the yoke 11, that is, on the inner peripheral surface 11c of the magnet storing portion 11d, two N-pole magnetized magnets 12n1 and 12n2, and two S-pole magnetized magnets 12s1 and 12s2 are adhered alternately and cylindrically by adhesive. And four magnets 12n1, 12n2, 12s1, and 12s2 generate 4-pole magnetic field. And as illustrated in FIG. 3A, the armature shaft 21 is rotatably supported by a shaft bearing 13 fitted on a bottom portion 11e of the yoke 11, and a shaft bearing 16 fitted on a cylindrical portion 15e of the gear case 15. As illustrated in FIGS. 2 and 3A, on a tip section of the armature shaft 21, a pair of worms 22 and 22' different in their torsional directions from each other are formed.

Figure 3B:
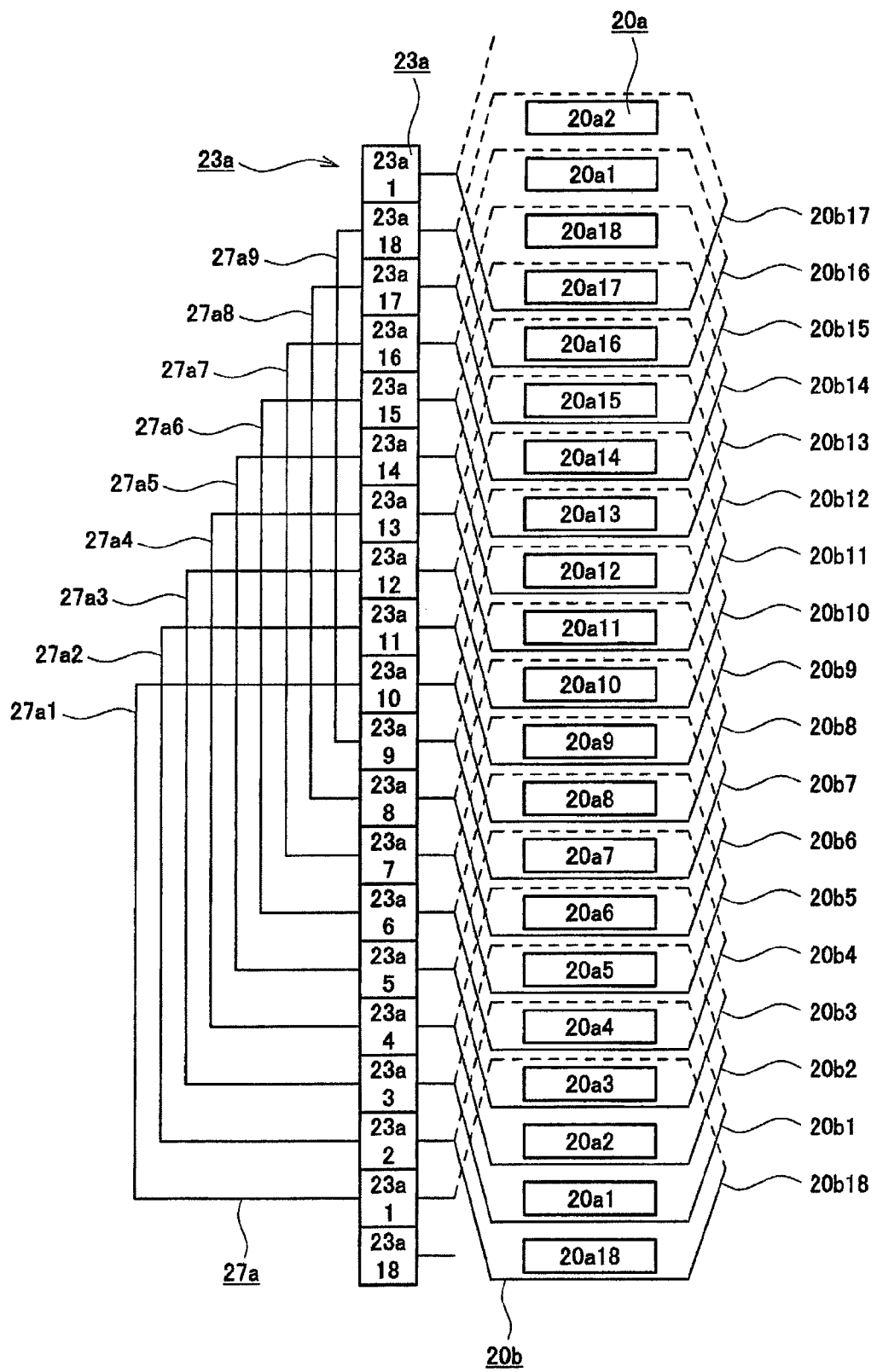
FIG. 3B is a winding diagram in an armature stored in the wiper motor.

The armature 20 is surrounded by four magnets 12n1, 12n2, 12s1, and 12s2 in the magnet storing portion 11d, and supported by the yoke 11 through the armature shaft 21. This armature 20 is composed of: an armature core 20a having 18 teeth portions fixed to the armature shaft 21 and arranged in the rotational direction; and an armature coil (winding) 20b wound around each the teeth portions of the armature core 20a. As illustrated in FIG. 3B, the armature winding 20b has 18 coil portions 20b1 to 20b18, the coil portion 20b1 is wound around four teeth portions 20a1, 20a2, 20a3 and 20a4. In the same manner, the coil portion 20b2 is wound around four teeth portions 20a2, 20a3, 20a4 and 20a5, the coil portion 20b3 is wound around four teeth portions 20a3, 20a4, 20a5 and 20a6, the coil portion 20b4 is wound around four teeth portions 20a4, 20a5, 20a6 and 20a7, the coil portion 20b5 is wound around four teeth portions 20a5, 20a6, 20a7 and 20a8, the coil portion 20b6 is wound around four teeth portions 20a6, 20a7, 20a8 and 20a9, the coil portion 20b7 is wound around four teeth portions 20a7, 20a8, 20a9 and 20a10, the coil portion 20b8 is wound around four teeth portions 20a8, 20a9, 20a10 and 20a11, the coil portion 20b9 is wound around four teeth portions 20a9, 20a10, 20a11 and 20a12, the coil portion 20b10 is wound around four teeth portions 20a10, 20a11, 20a12 and 20a13, the coil portion 20b11 is wound around four teeth portions 20a11, 20a12, 20a13 and 20a14, the coil portion 20b12 is wound around four teeth portions 20a12, 20a13, 20a14 and 20a15, the coil portion 20b13 is wound around four teeth portions 20a13, 20a14, 20a15 and 20a16, the coil portion 20b14 is wound around four teeth portions 20a14, 20a15, 20a16 and 20a17, the coil portion 20b15 is wound around four teeth portions 20a15, 20a16, 20a17 and 20a18, the coil portion 20b16 is wound around four teeth portions 20a16, 20a17, 20a18 and 20a1, the coil portion 20b17 is wound around four teeth portions 20a17, 20a18, 20a1 and 20a2, and the coil portion 20b18 is wound around four teeth portions 20a18, 20a1, 20a2 and 20a3. That is, the winding 20b of the armature 20 has eighteen coil portions 20b1 to 20b18 wound on the teeth portions 20a1 to 20a18 in a lap-winding fashion.

Figure 4:
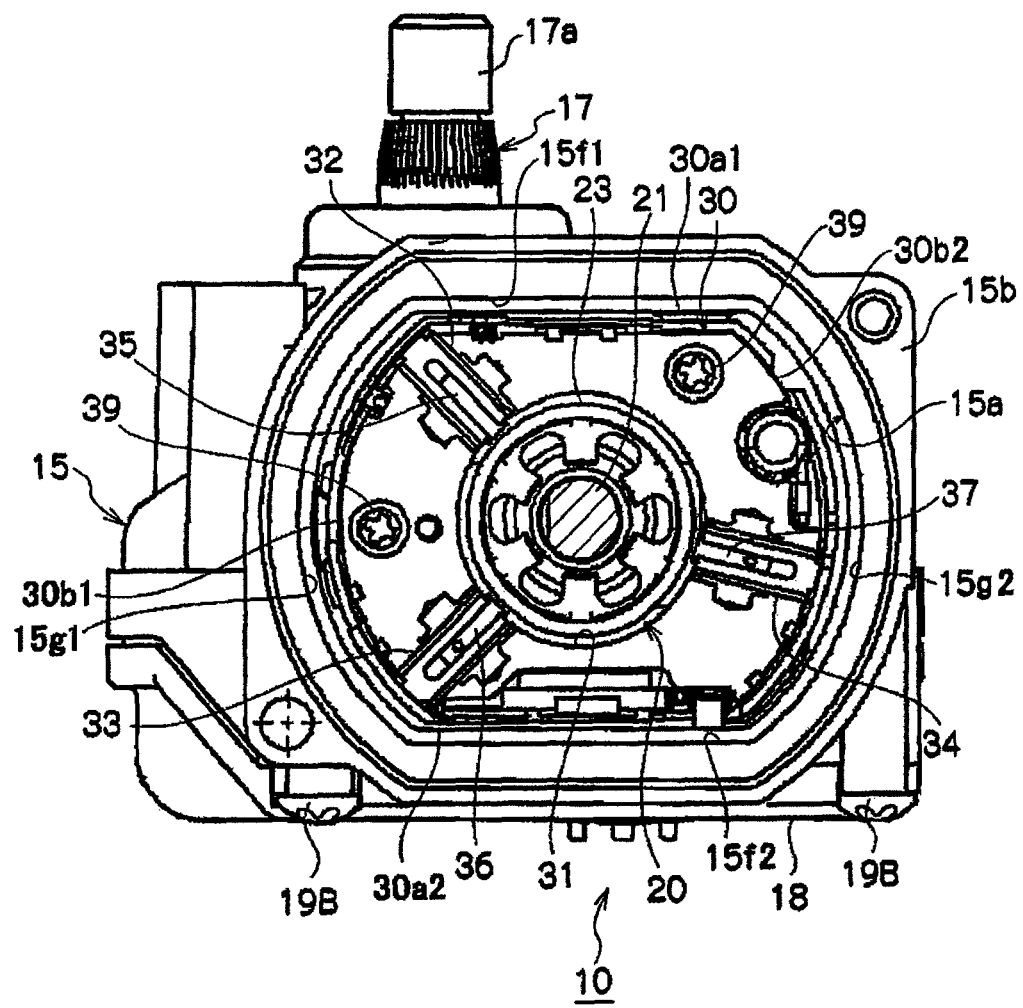
FIG. 4 is a front view of a gear case in the wiper motor.

Also, as illustrated in FIGS. 3A and 4, a commutator 23 is fixed to the armature shaft 21, and the commutator 23 includes eighteen commutator bars (segments) 23a1 to 23a18. These segments 23a1 to 23a18 are arranged on a front surface of a body 23c formed of insulating resin, and two terminals of the coil portion 20b1 of the winding 20b of the armature 20 are electrically connected to the respective segments 23a2 and 23a3. In the same manner, two terminals of the coil portion 20b2 of the winding 20b of the armature 20 are electrically connected to the respective segments 23a3 and 23a4, two terminals of the coil portion 20b3 of the winding 20b of the armature 20 are electrically connected to the respective segments 23a4 and 23a5, two terminals of the coil portion 20b4 of the winding 20b of the armature 20 are electrically connected to the respective segments 23a5 and 23a6, two terminals of the coil portion 20b5 of the winding 20b of the armature 20 are electrically connected to the respective segments 23a6 and 23a7, two terminals of the coil portion 20b6 of the winding 20b of the armature 20 are electrically connected to the respective segments 23a7 and 23a8, two terminals of the coil portion 20b7 of the winding 20b of the armature 20 are electrically connected to the respective segments 23a8 and 23a9, two terminals of the coil portion 20b8 of the winding 20b of the armature 20 are electrically connected to the respective segments 23a9 and 23a10, two terminals of the coil portion 20b9 of the winding 20b of the armature 20 are electrically connected to the respective segments 23a10 and 23a11, two terminals of the coil portion 20b10 of the winding 20b of the armature 20 are electrically connected to the respective segments 23a11 and 23a12, two terminals of the coil portion 20b11 of the winding 20b of the armature 20 are electrically connected to the respective segments 23a12 and 23a13, two terminals of the coil portion 20b12 of the winding 20b of the armature 20 are electrically connected to the respective segments 23a13 and 23a14, two terminals of the coil portion 20b13 of the winding 20b of the armature 20 are electrically connected to the respective segments 23a14 and 23a15, two terminals of the coil portion 20a14 of the winding 20b of the armature 20 are electrically connected to the respective segments 23a15 and 23a16, two terminals of the coil portion 20b15 of the winding 20b of the armature 20 are electrically connected to the respective segments 23a16 and 23a17, two terminals of the coil portion 20b16 of the winding 20b of the armature 20 are electrically connected to the respective segments 23a17 and 23a18, two terminals of the coil portion 20b17 of the winding 20b of the armature 20 are electrically connected to the respective segments 23a18 and 23a1, and two terminals of the coil portion 20b18 of the winding 20b of the armature 20 are electrically connected to the respective segments 23a1 and 23a2. In the commutator bars 23a1 to 23a18, as segments to be equalized in electric potential, that is, segments arranged so as to be opposite to each other on the commutator 23, the segments 23a1 and 23a10 are electrically connected to each other via a connecting conductor 27a1. In the same manner, the segments 23a2 and 23a11 are electrically connected to each other via a connecting conductor 27a2, the segments 23a3 and 23a12 are electrically connected to each other via a connecting conductor 27a3, the segments 23a4 and 23a13 are electrically connected to each other via a connecting conductor 27a4, the segments 23a5 and 23a14 are electrically connected to each other via a connecting conductor 27a5, the segments 23a6 and 23a15 are electrically connected to each other via a connecting conductor 27a6, the segments 23a7 and 23a16 are electrically connected to each other via a connecting conductor 27a7, the segments 23a8 and 23a17 are electrically connected to each other via a connecting conductor 27a8, and the segments 23a9 and 23a18 are electrically connected to each other via a connecting conductor 27a9.

As illustrated in FIGS. 1 to 5, in substantially center of a ceiling-wall portion of the gear case 15, an upper portion 17a of an output shaft 17 is protruded outside. To a lower portion 17b of the output shaft 17, an output gear 24 is jointed. The output gear 24 is meshed with each small-diameter gear 25a of a pair of worm wheels 25 and 25. Also, each large-diameter gear 25b of the pair of worm wheels 25 and 25 is meshed with a pair of worms 22 and 22' in the armature shaft 21. The pair of worms 22 and 22', the output gear 24, and the pair of worm wheels 25 and 25 are stored inside the speed-reduction-mechanism storing portion 15c of the gear case 15, and configure the speed-reduction mechanism 26. In addition, the upper portion 17a of the output shaft 17 is jointed to a wiper shaft of a wiper arm through a linkage mechanism (their illustrations are omitted), and when a wiper motor 10 is operated, the wiper arm is swung in an area of predetermined angles to wipe a windshield glass.

As illustrated in FIGS. 3A and 4, three brushes 35, 36, and 37 are retained on the brush holder 30, and arranged so as to face the commutator 23 arranged so as to face the commutator 23 inside the opening portion 15a of the gear case 15. Each of the brushes 35, 36, and 37 comes in sliding contact with the segments 23a to 23a18 of the commutator 23a. As illustrated in FIGS. 4 and 5, the opening portion 11a of the yoke 11 is formed into an oval shape, and composed of: a pair of flat portions 11f1 and 11f2 opposite to each other; and a pair of arc portions 11g1 and 11g2 between the pair of flat portions 11f1 and 11f1. The yoke 11 is provided with: an opening joint portion 11h for continuously connecting the oval-shaped opening portion 11a with the cylindrical magnet storing portion 11d; and a bottomed portion 11e. On the other hand, the opening portion 15a of the gear case 15 is formed into an oval shape, and provided with: a pair of horizontally-long flange-side flat portions 15f1 and 15f2; and a pair of arc portions 15g1 and 15g2. Since the opening joint portion 11h is provided between the opening portion 11a and the magnet storing portion 11d in the yoke 11, although the cylindrical magnet storing portion 11*d* in which four magnets are stored is smaller in diameter than the opening portion 11*a*, the opening portion 15*a* of the gear case 15, which is larger in size than the magnet storing portion 11*d* of the yoke 11, can be jointed smoothly to the opening portion 11*a* of the yoke 11. In this manner, the yoke can be improved in size and weight with ease, and the motor can be also sized down and lightened.

Also, as illustrated in FIGS. 1 and 2, a pair of opening-portion-side flat portions 15*i* and 15*i* is continuous from the pair of flange-side flat portions 15*f*1 and 15*f*2, and each of the opening-portion-side flat portions 15*i* and 15*i* is formed with triangular-shaped ribs 15*h* each extending from the flange portion 15*b* of the opening portion 15*a* in parallel with a shaft center of the armature shaft 21. In the pair of opening-portion-side flat portions 15*i* and 15*i*, each of the ribs 15*h* reduced in height with distance from the flange portion 15*b*. Therefore, the gear case 15 can be improved in intensity, and since the ribs 15*h* prevent the gear case 15 from having resonance frequencies corresponding to those of the armature 20, it is possible to reduce its operating noises and vibrations. In the wiper motor of this embodiment, three ribs 15*h* in each side, that is, a total of six ribs are formed on the pair of the opening-portion-side flat portions 15*i* and 15*i*. However, the number or each length of the ribs 15*h* can be changed depending on design specification of the motor.

A brush holder 30 is stored in the opening portion 15*a* of the horizontally-long oval-shaped gear case 15, and fastened to the gear case 15 with screws 39. The brush holder 30 is composed of: a pair of flat portions 30*a*1 and 30*a*2; and a pair of arc portions (joint portions) 30*b*1 and 30*b*2 connected via the pair of flat portions 30*a*1 and 30*a*2. In the center of this oval-shaped brush holder 30, a circular-shaped through hole 31 through which the commutator 23 and the armature shaft 21 are introduced is formed. And the commutator 23 and the armature shaft 21 introduced through the through hole 31 of this brush holder 30 are arranged. Three brush boxes (brush storing portions) 32, 33, and 34 are fixed to this brush holder 30, and the brushes 35, 36, and 37 freely come in and out of the respective brush boxes 32, 33, and 34.

Figure 6:
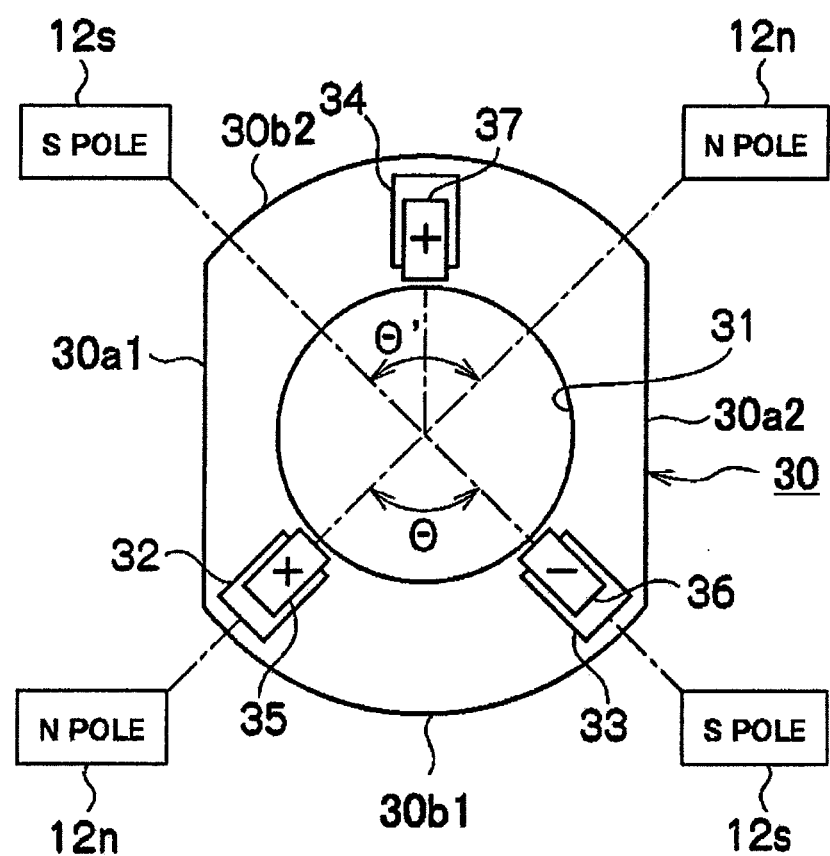
FIG. 6 is an explanation diagram of a relation among magnetic poles, brush holders, and brushes stored in an opening portion of the gear case.

As illustrated in FIGS. 4 and 6, the brush boxes 32 and 33 are arranged on one arc portion 30*b*1, and the brush box 34 is arranged on the other arc portion 30*b*2. Therefore, the brush 35 stored in the brush box 32 and the brush 36 stored in the brush box 33 are arranged on one arc portion 30*b*1, and the brush 37 stored in the brush box 34 is arranged on the other arc portion 30*b*2. Furthermore, the brush boxes 32 and 33 are perpendicularly arranged (that is, shifted around the armature shaft 21 in the rotation direction by an angle of 90 degrees), and the brush box 34 is arranged within an included angle θ' (θ'=90°) opposite to an included angle θ (θ=90°) formed by these first brush box 32 and second brush box 33. That is, the brush box 34 is arranged so as to be shifted from the brush boxes 32 and 33 by an angle of 90 or more degrees. Therefore, the brush 37 is arranged so as to be shifted from the brushes 35 and 36 by an angle of 90 or more degrees.

The brush box 32 is electrically connected to the brush 35, and a current for rotating the armature at low speed is selectively supplied to the brush box 32. The brush box 33 is electrically connected to the brush 36 and connected to the common electric potential. The brush box 34 is electrically connected to the brush 37, and a current for rotating the armature at high speed is selectively supplied to the brush box 34. Since each of the brushes 35, 36, and 37 is electrically connected to a motor control circuit (not shown), the armature can be selectively rotated at low or high speed.

Since the wiper motor of the above-mentioned embodiment includes: four magnets; an armature core having eighteen teeth portions; a winding having eighteen coil portions; a commutator having eighteen commutator bars (segments); and three brushes, two segments of each pair of commutator bars of the commutator 23*a* are arranged so as to be opposite to each other, and electrically connected to each other so as to be the same in electric potential via the corresponding equalizer 27, the common brush 36 and the low-speed driving brush 35 are arranged on the brush holder 30 and shifted from each other by 90 degrees, and the high-speed driving brush 37 are arranged on the brush holder and shifted from the common brush 36 and the low-speed driving brush 35 by 90 degrees, the wiper motor can be sized down and thinly lightweight by the down sizing, and generate a large torque without generating large vibrations and large noises.

Furthermore, as illustrated in FIGS. 4 and 6, since the brush holder 30 is formed into an oval shape, the common brush 36 and the low-speed driving brush 35 are arranged on one arc portion 30*b*1 of the oval-shaped brush holder 30, and the high-speed driving brush 37 are arranged on the other arc portion 30*b*2, the wiper motor 10 can be further sized down and thinly lightweight by the down sizing.

The present invention can be applied in manufacturing a wiper motor which is sized down and thinly lightweight.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper motor having: a speed reduction unit with an output shaft for driving a wiper apparatus of an automotive vehicle; and an electric motor for driving the speed reduction unit, the electric motor comprising:
    magnetic field generating means composed of: a magnetic yoke formed into a bottomed cylinder; and four magnets arranged cylindrically on an inner surface of the magnetic yoke, and alternatively in north and south magnetic poles,
    an armature surrounded by the magnets and accommodated in the magnetic yoke, the armature having:
        an armature shaft rotatably supported by the magnetic yoke;
        a core fixed to the armature shaft, the core being composed of eighteen teeth portions;
        a commutator fixed to the armature shaft, the commutator being composed of: a commutator body formed of insulating resin, and eighteen commutator bars insulated from each other and arranged on the commutator body; and
        a winding composed of eighteen coil portions wound on the teeth portions, each of the coil portions surrounding corresponding teeth portions, each of the coil portions of the winding having two terminals connected to corresponding commutator bars adjacent to each other;
    an equalizer composed of nine connecting conductors each of which is electrically connected to two corresponding commutator bars opposite to each other, and
    brush assemblies including a first brush, a second brush shifted from the first brush by 90 degrees, and a third brush shifted from the first and second brushes by 90 or more degrees, each brush being arranged so as to come in slidable contact with the commutator bars, the first brush being connected to a common electric potential, a current for rotating the armature at low speed is selectively supplied to the second brush, and a current for rotating the armature at high speed is selectively supplied to the third brush.

2. The wiper motor according to claim 1, wherein each of the coil portions of the winding of the armature is wound so as to surround four corresponding teeth portions of the core of the armature.

3. The wiper motor according to claim 1, wherein the winding of the armature are wound on the teeth portions of the core of the armature in a lap-winding fashion.

4. The wiper motor according to claim 1, wherein the brush assemblies further includes a brush holder formed into an oval shape, the brush holder having first and second arc portions, and first and second flat portions connected to each other via the first and second arc portions,
wherein the first and second brushes are arranged on the first arc portion, and
wherein the third brush is arranged on the second arc portion.

5. The wiper motor according to claim 4, wherein the first and second flat portions of the brush holder of the brush assemblies are arranged in a direction perpendicular to the output shaft.

6. A wiper motor having: a speed reduction unit with an output shaft for driving a wiper apparatus of an automotive vehicle; and an electric motor for driving the speed reduction unit, the electric motor comprising:
magnetic field generating means has: a magnetic yoke formed into a bottomed cylinder; and four magnetic poles arranged cylindrically on an inner surface of the magnetic yoke, and alternatively in north and south magnetic poles,
an armature surrounded by the magnetic poles and accommodated in the magnetic yoke, the armature having:
an armature shaft rotatably supported by the magnetic yoke;
a core fixed to the armature shaft, the core being composed of eighteen teeth portions;
a commutator fixed to the armature shaft, the commutator being composed of: a commutator body formed of insulating resin, and eighteen commutator bars insulated from each other and arranged on the commutator body;
a winding composed of eighteen coil portions wound on the teeth portions in a lap-winding fashion, each of the coil portions surrounding corresponding teeth portions, each of the coil portions of the winding having two terminals connected to corresponding commutator bars adjacent to each other; and
an equalizing portion composed of nine connecting conductors each of which is electrically connected to two corresponding commutator bars opposite to each other, and
brush assemblies including a first brush, a second brush shifted from the first brush by 90 degrees, and a third brush shifted from the first and second brushes by 90 or more degrees, each brush being arranged so as to come in slidable contact with the commutator bars, the first brush being connected to a common electric potential, a current for rotating the armature at low speed is selectively supplied to the second brush, and a current for rotating the armature at high speed is selectively supplied to the third brush.

7. The wiper motor according to claim 6, wherein the brush assemblies further includes a brush holder formed into an oval shape, the brush holder having first and second arc portions, and first and second flat portions connected to each other via the first and second arc portions,
wherein the first and second brushes are arranged on the first arc portion, and
wherein the third brush is arranged on the second arc portion.

8. The wiper motor according to claim 7, wherein the first and second flat portions of the brush holder of the brush assemblies are arranged in a direction perpendicular to the output shaft.

9. The wiper motor according to claim 6, wherein each of the coil portions of the winding of the armature is wound so as to surround four corresponding teeth portions of the core of the armature.

10. A wiper motor having: a speed reduction unit with an output shaft for driving a wiper apparatus of an automotive vehicle; and an electric motor for driving the speed reduction unit, the electric motor comprising:
magnetic field generating means composed of: a magnetic yoke formed into a bottomed cylinder; and four magnets arranged cylindrically on an inner surface of the magnetic yoke, and alternatively in north and south magnetic poles,
an armature surrounded by four magnetic poles and accommodated in the magnetic yoke, the armature having:
an armature shaft rotatably supported by the magnetic yoke;
a core fixed to the armature shaft, the core being composed of eighteen teeth portions;
a commutator fixed to the armature shaft, the commutator being composed of: a commutator body formed of insulating resin, and eighteen commutator bars insulated from each other and arranged on the commutator body; and
a winding consisting essentially of eighteen coil portions wound on the teeth portions in a lap-winding fashion, each of the coil portions surrounding corresponding teeth portions, each of the coil portions of the winding having two terminals connected to corresponding commutator bars adjacent to each other;
an equalizing portion composed of nine connecting conductors each of which is electrically connected to two corresponding commutator bars opposite to each other, and
brush assemblies including a first brush, a second brush shifted from the first brush by 90 degrees, and a third brush shifted from the first and second brushes by 90 or more degrees, each brush being arranged so as to come in slidable contact with the commutator bars, the first brush being connected to a common electric potential, a current for rotating the armature at low speed is selectively supplied to the second brush, and a current for rotating the armature at high speed is selectively supplied to the third brush.

11. The wiper motor according to claim 10, wherein the brush assemblies further includes a brush holder formed into an oval shape, the brush holder having first and second arc portions, and first and second flat portions connected to each other via the first and second arc portions,
wherein the first and second brushes are arranged on the first arc portion, and
wherein the third brush is arranged on the second arc portion.

12. The wiper motor according to claim 11, wherein the first and second flat portions of the brush holder of the brush assemblies are arranged in a direction perpendicular to the output shaft.

13. The wiper motor according to claim 10, wherein each of the coil portions of the winding of the armature is wound so as to surround four corresponding teeth portions of the core of the armature.

14. The wiper motor according to claim 1, wherein the gear case has a first oval opening portion in which the brush holder is accommodated, and wherein the yoke has a second oval opening portion which is connected to the first opening portion of the gear case.

15. The wiper motor according to claim 14, wherein the first opening portion of the gear case has a third flat portion parallel to the first flat portion of the brush holder.

16. The windshield wiper motor according to claim 15, wherein the third flat portion is integrally formed with a plurality of ribs extending in parallel with each other.

\* \* \* \* \*